UNITED STATES PATENT OFFICE.

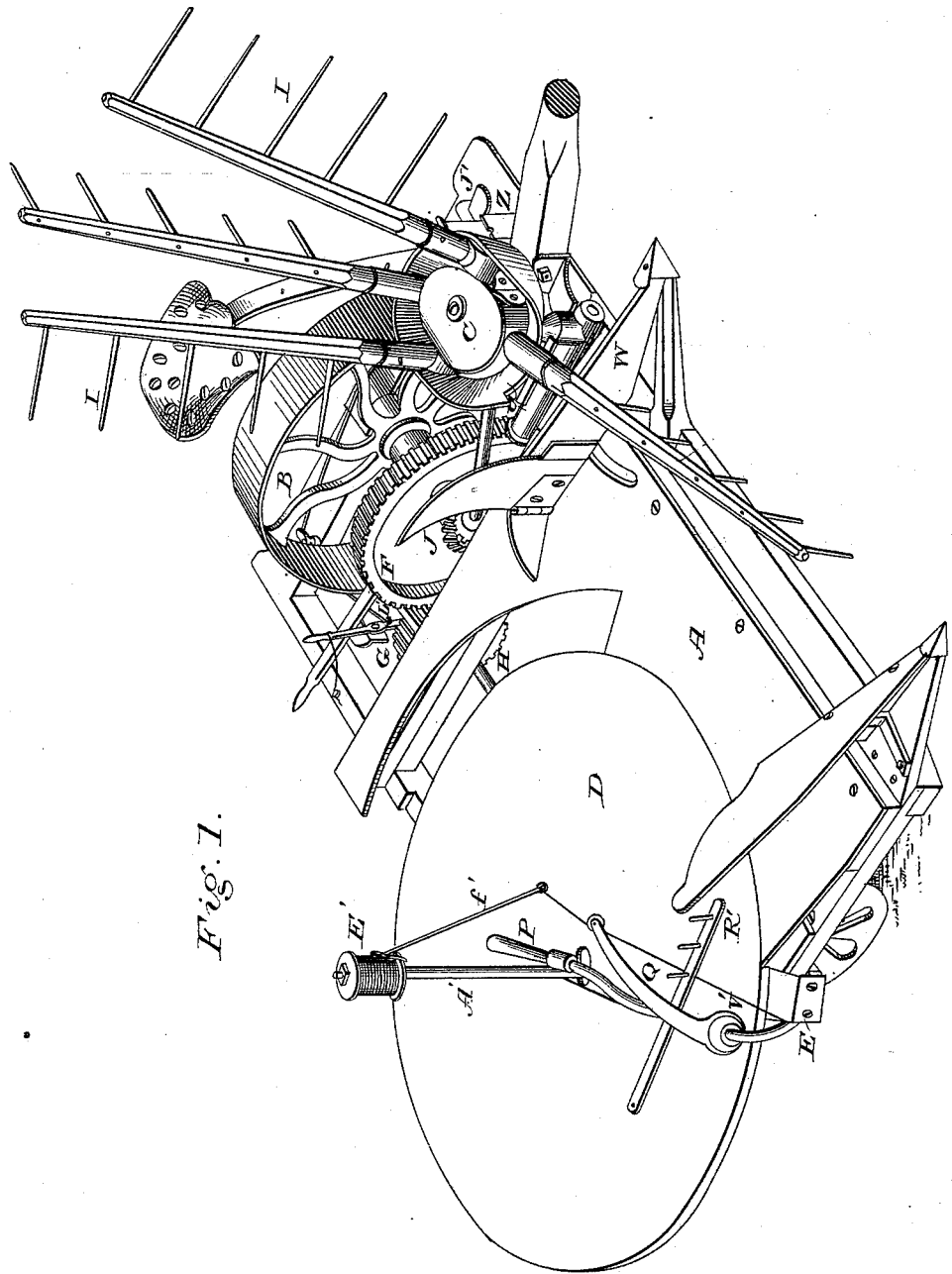

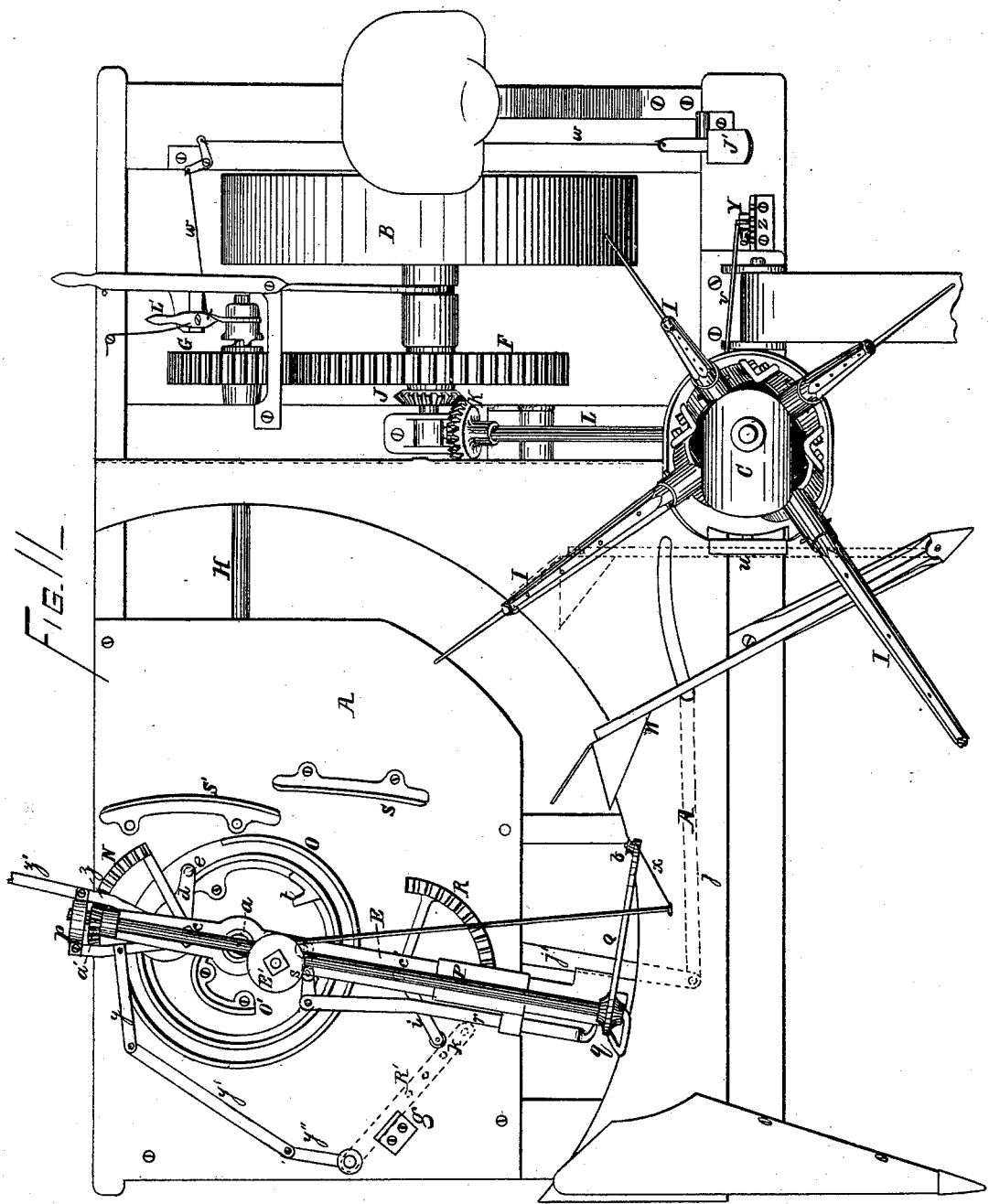

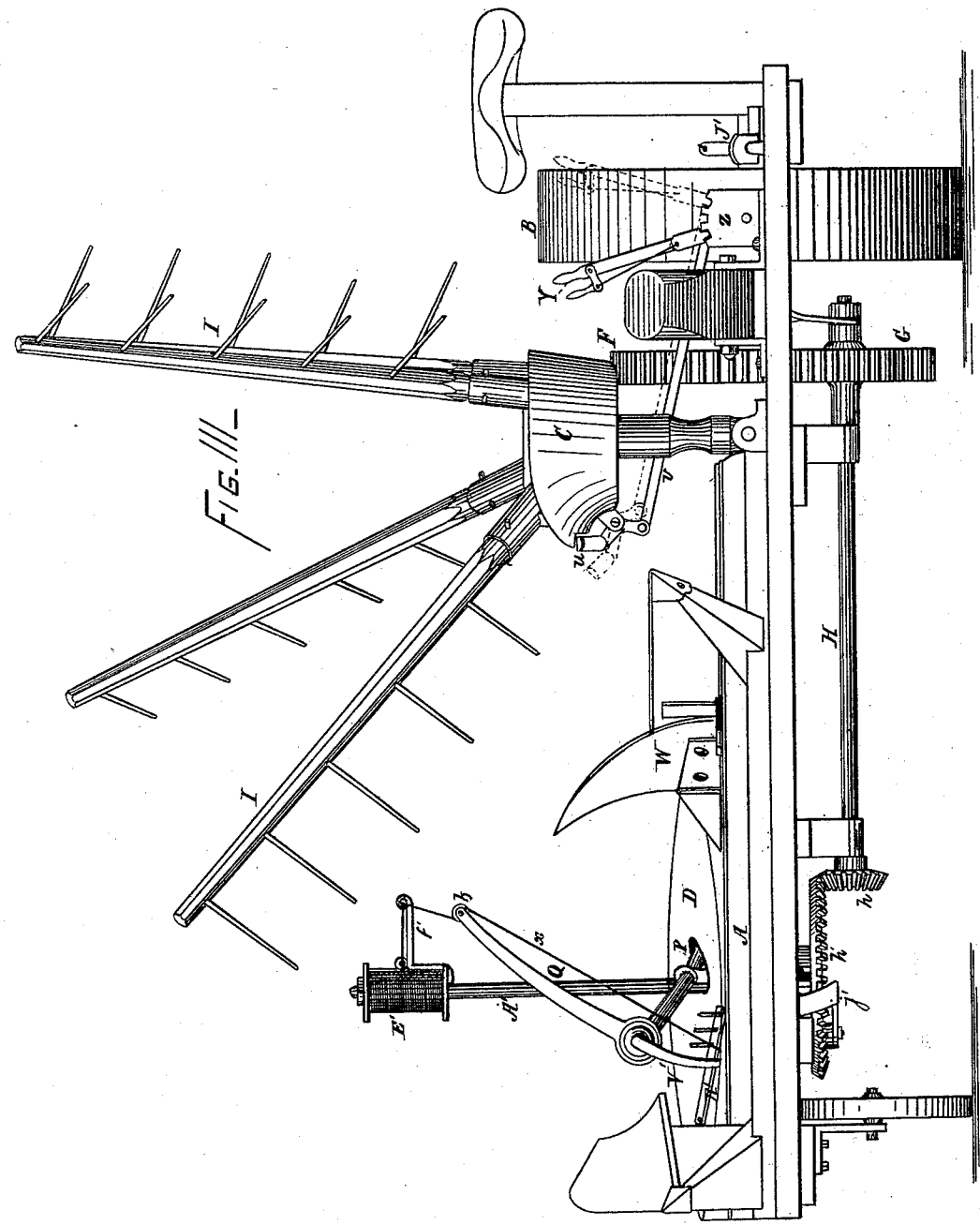

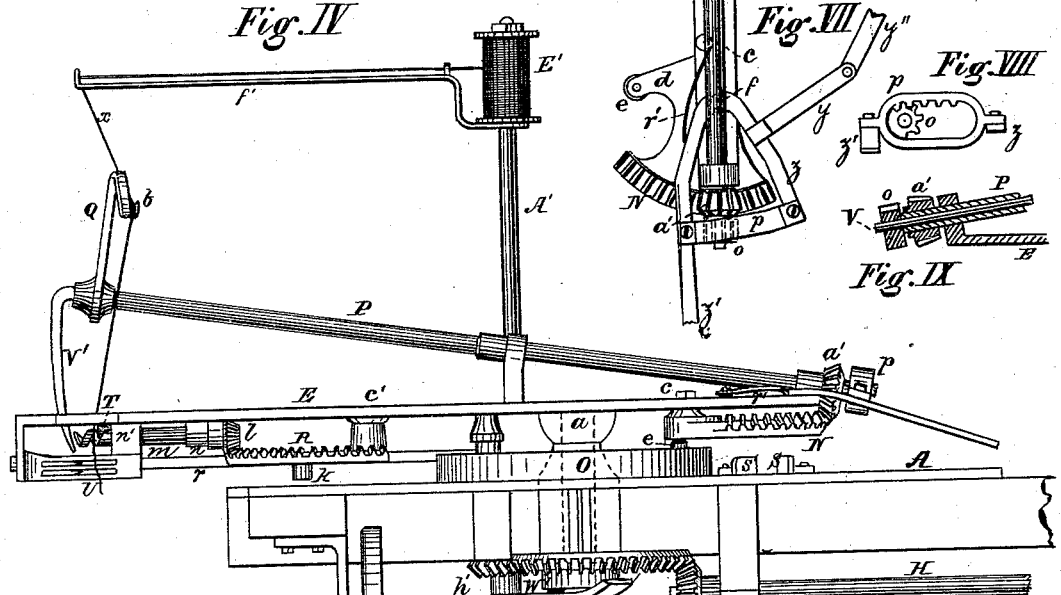
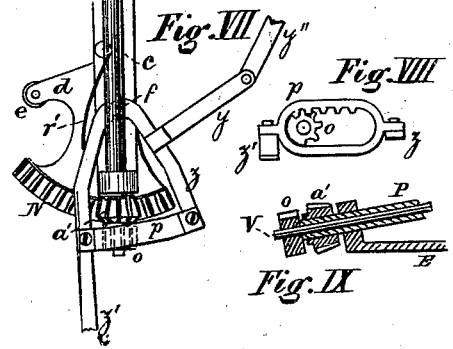
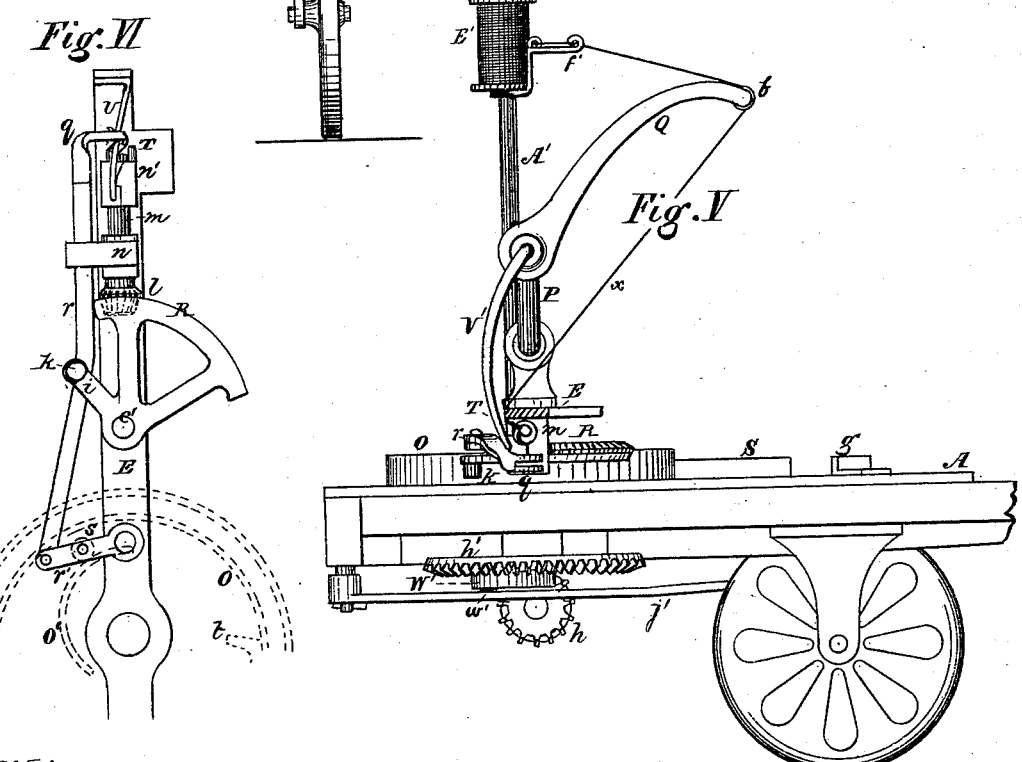
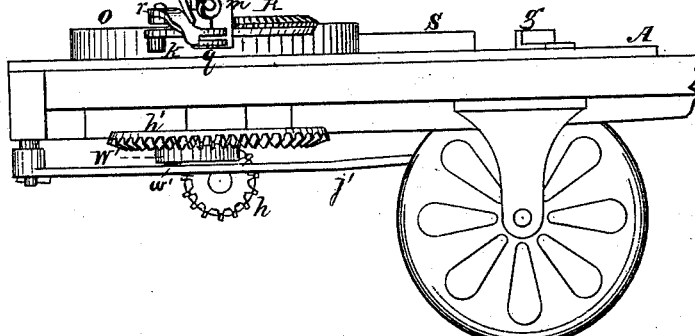

SAMUEL JOHNSTON, OF BROCKPORT, NEW YORK.

IMPROVEMENT IN GRAIN-BINDING HARVESTERS.

Specification forming part of Letters Patent No. 222,633, dated December 16, 1879; application filed December 4, 1878.

*To all whom it may concern:*

Be it known that I, SAMUEL JOHNSTON, of Brockport, in the county of Monroe and State of New York, have invented certain new and useful Improvements in Harvesting-Machines, of which the following is a full, clear, and precise description, reference being had to the accompanying drawings, which form a part of this specification.

My invention consists of an organized machine for gathering, cutting, and binding the grain, and in the detail parts of the said machine as follows: first, the arrangement of the reel which gathers the grain to the cutters so that it will also move the cut grain back on the platform to the proper distance to insure its being bound at or near the middle of the bundle; second, devices for the adjustment of the extent of the sweep of the reel on the platform before rising out of the way of the binding apparatus, so as to adapt its action to grain of various lengths, and insure the proper presentation of the grain to the binding apparatus at all times; third, the vibrating or swinging divider on the inner side of said machine, so as to operate in conjunction with a compressing device attached to or forming part of a rotating frame, between which compressor and swinging divider the grain is compressed in readiness for binding; fourth, the employment of an oscillating binding-arm attached to a rotating frame to place the wire around the bundle while compressed; fifth, a twisting apparatus arranged to twist the wire when placed by the oscillating arm, as last above mentioned; sixth, a cutting apparatus to sever the wire after it has been placed around the bundle by the binding-arm; seventh, a detaching apparatus to release the bundle from the binding-arm; eighth, the arrangement of the gearing of the reel and the gearing which drives the rotating frame and platform which carry the binding-arm and compressing-arm so that the said binding-arm and compressing-arm shall be made to pass across the front of the platform, moving the cut grain in front of it in the interval between the passage of one reel-arm and the succeeding arm.

In the drawings, Figure I represents a perspective view of a harvesting-machine with my binding mechanism attached thereto; Fig. II, a plan view of the same with the cover to the binding mechanism removed, in order to show the mechanism, levers, &c., which control the movement of the binding-frame. Fig. III is a front elevation; and Figs. IV, V, VI, VII, VIII and IX are detached sectional views of part of the binding mechanism.

Similar letters of reference indicate corresponding parts in all the figures.

A represents the platform; B, the driving-wheel, and C the guide-cam for the gathering mechanism of a harvesting-machine. D is a cover to the binding mechanism, which is supported by and revolves with the binding-frame E. The gear F, which is mounted on the shaft of the driving-wheel, has attached to it a bevel-pinion, J, which communicates motion to the reel-arms I I by meshing with the pinion K on the lower end of the shaft L.

On the upper end of the shaft L is mounted a pinion which gives motion to the head to which the reel-arms I I are attached. The reel-arms are provided with teeth, so as to gather the grain, and also, by means of an adjustable stop, *u*, hereinafter described, move it a greater or less distance back on the platform, in this manner regulating the point at which the wire is passed around the bundle. The relative proportion of the gearing which drives the reel-arms and the gearing for driving the binding mechanism is such as to cause the reel-arms to rotate and the binding mechanism to move across the front of the platform in such unison that the binding mechanism passes from right to left on the platform across the front in the interval between the passage of two successive reel-arms across the front line or track pursued by the binding-arms across the platform, so that the reel-arms shall not throw the grain on top of the binding apparatus while it is traversing across the platform.

The binding mechanism and binding-arm can be made to pass from left to right across the platform by a slight modification of the gearing and mechanism which operates them, only not with quite so good a result.

The gear F is constructed with external and internal teeth, the internal teeth driving a bevel-pinion which communicates motion to the cutting apparatus, and the external teeth-meshing into the pinion G, communicate motion to the shaft H, which, by bevel-gears $h$ and $h'$, revolves the shaft $a$, on which the binding-frame E is mounted, thereby revolving said arm, together with the cover D. At the point $c$ of the binding-frame E is pivoted the segmental gear N, having a projecting piece, $d$, carrying the roller $e$, which travels around in the path of the cam O. The segmental gear N, by meshing into the pinion $a'$, gives an oscillating motion to the hollow shaft P, which is mounted on the binding-frame E. At the other extremity of the shaft P is secured the binding-arm and wire-carrier Q, on the outer end of which is attached a roller, $b$, through which the wire $x$ is carried to the wire-holder.

V is a rod or shaft, which passes through and is supported by the hollow shaft P. The outer end of this shaft V is formed into or has attached to it a compressing-arm, V', which acts, in connection with the inner divider, W, as hereinafter set forth, to compress the grain preparatory to its being bound.

The compressor is operated by a pinion, $o$, mounted on the inner end of the shaft V, engaging into the rack-frame $p$, as shown in Figs. VII, VIII, and IX.

The rack-frame $p$ is mounted on a support, $z$, which is pivoted to the binding-frame E at the point $f$.

$z'$ is an extension or supplemental arm of the support $z$, which, during the revolution of the binding-frame E, strikes against the cam $g$, giving the arm $z'$ and support $z$ a reciprocating movement, which, by the action of the pinion $o$ and rack-frame $p$, throws the compressor upward. After the arm $z$ has passed the cam $g$, the action of the spring $r'$ forces the above parts to their original positions.

At the point $c'$ of the binding-frame E is pivoted the segmental gear R, with a projecting piece, $i$, carrying the roller $k$. This roller $k$, as the frame E is revolved, strikes against the cam-pieces S S', giving an oscillating movement to the segmental gear R, thereby communicating motion to the pinion $l$ and wire-twister $m$, which is secured to the binding-frame E by bearings $n\ n'$.

The outer extremity of the wire-twister $m$ is formed into the shape of a spiral screw, whose purpose is to seize the wire at the proper time, and, by revolving, twist it, and afterward cut it off by pressing it into contact with the knife T, located near the shank of the spiral.

U is a wire-holder, formed of a slotted spring and the lower part of the bearing $n'$, by which the wire is firmly held.

The wire is thrown into the wire-holder and against the twister by a fork, $q$, in the following manner: The fork is attached to, or forms part of, an arm, $r$, which is joined to a smaller arm, $r'$, on which a roller, $s$, is mounted. The other end of the arm $r'$ is secured to the binding-frame E. As the frame E revolves the roller $s$ strikes against the stop $t$, which causes the arm $r$ to be drawn inwardly, the fork $q$ carrying the wire with it into the wire holder and twister. As the frame E continues its revolution the roller $s$ at length strikes the cam O', by the action of which the arm $r$ is drawn back to its first position.

The inner divider, W, is pivoted at its point or front end to allow it to vibrate horizontally on that pivot, and co-operates with the compressing-arm V', in compressing the grain, in the manner hereinafter described. The divider W is caused to vibrate by the rods $j$ and $j'$, the rod $j$ being attached to the under part of the divider through a slot in the platform A, and the rod $j'$ having fixed upon it a roller, $w'$, which works in a cam, W', on the under surface of the bevel-gear $h'$. The action of the cam W' and roller $w'$ imparts a reciprocating motion to the rods $j$ and $j'$, which throws the divider inwardly and outwardly at the proper time, thereby compressing the grain which has been accumulating on the platform, as before described.

To the guide-cam C is pivoted a stop, $u$, which is made adjustable by being attached to a hand-lever, Y, by means of a rod, $v$. The lever Y is pivoted to a rack-segment, Z, and is provided with a spring-pawl, which fits into the detents of the rack-segment Z, thereby allowing the stop $u$ to be secured at any desired position. The object of this adjustable stop is to regulate the sweep of the reel-arms, as before described.

R' is a rake attachment, whose function is to seize the bundle after it is bound and release it from the binding-head, so that it will be deposited on the ground. It is operated by a series of jointed levers, $y\ y'\ y''$, to which it is attached, the motion of the said levers being regulated by the movement of the rack-frame $p$, as before described.

A' is an upright standard, which is mounted on the binding-frame near its center. On the upper end of the standard is secured the reel E', for holding the wire $x$, and a rod, $f'$, for conducting the wire to the binding-arm Q.

The driver, by depressing the foot-piece J', which swings the lever L' by means of connecting-rods $w\ w$, can throw the pinion G out of gear, thereby causing the binding-frame E to rest or revolve at pleasure, by this means regulating the size of the bundles.

In the operation of the machine the grain is pressed on the cutters by one of the reel-arms, and then back onto the platform, to secure its being bound at or near the middle of the bundle. Second and third reel-arms carry the grain to the same point. Immediately after the third reel-arm has carried the grain to that point, and in the interval before the fourth reel-arm has caused the grain to fall on the platform, the rotating shaft $a$ causes the binding-arm to pass across the platform from right to left, thus avoiding the cut grain being thrown upon the binding-arm while revolving, which is of the first importance in the application of a rotating binding apparatus in connection with a revolving reel.

The operation of the binding mechanism is as follows: The wire x having been previously wound on the reel E', mounted on the standard A', the end is carried through guides on the wire-carrying rod f' to the roller b on the binding-arm Q, and from there it is drawn down and secured in the wire-holder U. As the machine advances motion is communicated by the gears F and G, shaft H, and bevel-gears h h' to the shaft a, on which the binding-frame E is mounted. As the binding-arm Q approaches the front of the platform, the roller w', following the path of the cam W', throws the swinging divider W, by the action of the rods j and j', inward, by this means carrying the grain from the corner toward the center of the platform. At the same time the compressing-arm V' passes across the front of the platform toward the swinging divider, and thus compresses the grain between them. The roller e, following in the path of the cam O, oscillates the segmental gear N, and thereby the pinion a' and the hollow shaft P are oscillated. The oscillation of the shaft P forces the binding-arm Q downward, by this means carrying the wire around the bundle of compressed grain previously deposited at the proper position on the platform by the reel-arms I I, as above described. At this moment the roller k strikes against the cam-piece S, causing the wire-twister m to revolve, seize and twist the wire, and then, by contact with the knife T, cut it off. After the end of the wire has been twisted to fasten it around the bundle, as before described, the continuous revolving motion of the binding-frame carries the bundle to the rear until the arm z' strikes against the cam g, which, as before described, throws the compressor upward, thus releasing the bundle, which is then, by the same movement of the arm z' and cam g, thrown upon the ground by the rake R'.

Having thus described my invention, what I claim as new, and desire to secure by Letters Patent, is—

1. The combination, in a harvesting-machine, of a compressing device attached to or moving with a rotating frame and a vibrating inner divider for compressing the grain into a bundle, substantially as described.

2. The combination, with a vibrating inner divider, of a compressing-arm which is given a rotating movement upon a vertical axis to carry it against the divider and an oscillating movement upon its own pivotal point to gather and release the grain, substantially as shown and described.

3. The combination, with a revolving rake and reel, of mechanism for controlling the length of sweep of the successive arms to bring grain of different lengths into the proper relation to the binding mechanism to receive the band at the middle, substantially as shown and set forth.

4. The adjustable stop or guide u, for regulating the course pursued by the several rake-arms I I, so that the grain shall be carried to the proper position on the platform for being bound at or near the middle, according to the variable lengths of the grain, substantially as shown and described.

5. The oscillating binding-arm and band-carrier Q, moving with the rotating frame E, and oscillated by suitable mechanism during such rotation to carry the band around the bundle of grain, substantially as set forth.

6. The combination, with the oscillating binding-arm moving with the rotating frame E, of suitable band-securing mechanism, substantially as described.

7. The combination of the binding-arm and its oscillating shaft, the rotating frame upon which it is carried, and the rake for ejecting the bundle after it is bound, substantially as shown and set forth.

8. The combination, in a harvesting-machine, of an oscillating compressing-arm and an oscillating band-carrying arm mounted upon a suitable frame or carriage, and controlled by mechanism which causes the compressing-arm to descend at the outer or grain side of the platform, sweep around behind the cutter-bar, and gather the grain against the inner divider, then actuates the band-carrying arm to place the band around the bundle, and finally gives them a further movement to the rear, when they are opened and the bound bundle delivered, substantially as described.

9. The combination, with the platform of a harvester and a discharging-rake, of two overhanging oscillating arms mounted upon a suitable frame or carriage, and controlled by mechanism which causes one arm to descend at the outer or grain side of the platform, sweep around behind the cutter-bar, and gather the grain against the inner divider, then actuates the other to descend and grasp the bundle, and finally gives them a further movement to the rear, when they are opened and the bundle discharged by the rake, substantially as described.

10. The combination, with a revolving reel, of the revolving frame E, which carries the binding mechanism, the revolutions of the two being so timed and controlled that the binding mechanism is passed across the front of the platform, moving and gathering the freshly-laid gavel before it in the interval between the successive passages of the two arms of the reel.

11. The spiral twister, constructed and arranged, as described, in combination with the cutter, as shown.

SAMUEL JOHNSTON.

Witnesses:
ALBERT E. ZACHERLE,
JOHN R. BENNETT.